United States Patent Office 3,681,226

Patented Aug. 1, 1972

3,681,226

SPUTTERING PROCESS FOR MAKING FERROELECTRIC FILMS

Siegfried F. Vogel, Los Gatos, Calif., assignor to International Business Machines Corporation, Armonk, N.Y.

No Drawing. Filed July 2, 1970, Ser. No. 52,135
Int. Cl. C23c 15/00
U.S. Cl. 204—192 13 Claims

ABSTRACT OF THE DISCLOSURE

The fabrication, composition and utilization of sputtering cathodes or targets for mixed oxide or ferroelectric films comprising two or more metals. Such cathodes are made from the blended metal powders by compression into disks. These disks are soldered against a metallic, water-cooled backing plate. Sputtering with DC or RF power takes place in a reactive, specifically an oxidizing, atmosphere.

CROSS REFERENCE TO RELATED APPLICATIONS

Application Ser. No. 769,757 by D. W. Chapman et al., filed Oct. 22, 1968, now abandoned, assigned to the assignee of this invention, discloses ferroelectric film compositions that may be made by the target and method of this invention.

FIELD OF THE INVENTION

This invention relates to ferroelectric films: their composition and method of manufacture, and specifically, the method of making a sputtering target and of depositing ferroelectric films by sputtering techniques.

BACKGROUND OF THE INVENTION

Ferroelectric films may be advantageously used in many applications. One such application is as part of a ferroelectric photoconductive (FEPC) storage device as shown in U.S. Patent 3,148,354 by R. Schaffert, and assigned to same assignee as the assignee of this invention. Such an FEPC storage device essentially comprises a conductive substrate upon which is successively deposited a ferroelectric film, a photoconductive film, and another conductive film. The operation of such device is sufficiently described in the above-reference patent, which is incorporated herein for its teachings.

Some recent publications and patents that indicate the use of ferroelectric materials in logic and memory device include: G. W. Taylor, IEEE Trans. Electron. Computers EC–14, 881 (1965); P. M. Heyman and G. H. Heilmeier, Proc. IEEE 54, 842 (June 1966); C. E. Land, IEEE International Electron Devices Conference, Washington, D. C., 18–20 October 1967; R. H. Plumlee, 1966 WESCON Conv. Rec., 10, Paper 3.2 (August 1966); G. W. Taylor, J. Appl. Phys., 38, 4697 (1967); T. E. Luke, IEEE Trans on Electron Devices, vol. ED–16, No. 6, June 1969, p. 576; C. Feldman, Rev. Sci. Insts. 26, No. 5, May 1955, p. 463; W. J. Taker et al., Appl. Phys. Letters 15, No. 8, Oct. 15, 1969, p. 256; B. S. Dhall, Switching Properties of Thick Film Ferroelectric $KNO_3$, M. S. Thesis, Michigan Technological University, Houghton, Mich., 1969.

For optimum performance of such devices, the ferroelectric material should be in the form of a film no thicker than a few microns; furthermore the material should have square hysteresis loop, small coercive force, and consistent switching performance for many switching cycles, i.e., the material should not suffer from switching fatigue.

Unsuccessful attempts have been made to make satisfactory ferroelectric films of $BaTiO_3$, $Bi_4Ti_3O_{12}$, and $KNO_3$ as thin as a few microns. Prior art investigations were of $Pb(Zr, Sn, Ti)O_3$ type materials thicker than one-half mil, and in general several mils thick.

Sputtering would initially appear to offer an attractive approach for making thin ferroelectric films.

Thin films of mixed oxide and ferroelectric materials have previously been sputtered in a variety of ways.

One prior art method had the sputtering target consisting of two metal sectors of lead and titanium which were sputtered independently with DC voltages in oxygen, and the anode was constantly rotated under this target in order to obtain homogeneous films. Another method utilized ceramic targets of barium-lanthanum-titanate, which was chemically reduced to become conductive and was sputtered with DC reactively in oxygen.

In another method, in order to produce lead tellurium oxide, the target was produced of the alloy of both metals and was DC sputtered in a reactive atmosphere. Still another method utilized barium titanate sputtered in a neutral atmosphere with radio frequency (RF) power using a ceramic target of the same composition as the source. Still another method is to RF sputter in oxygen or an oxygen-argon mixture a ceramic target comprising the ferroelectric composition above, containing the oxides of the six metals of the ferroelectric compound of the perovskite type.

Aside from sputtering, attempts have been made to deposit such a ferroelectric composition film by centrifugal or spin coating, or by sedimentation techniques upon the conductive substrate, followed by sintering.

The problems involved to varying degrees with all of the above particle techniques include porosity of the final film, which when used in ferroelectric storage results in shorting between alternating layers; and particularly inability to make thin enough films. For example, it is often desired to have a one micron thick nonporous film. To achieve this by, for example, the sedimentation technique, would require particles far less than one micron in size. It is both difficult to make such particles and to maintain them in the suspension in attempting to utilize the sedimentation or spin coating or centrifugal technique.

Attempts at evaporation or vacuum depositing of such films fail as the composition decomposes at the elevated temperature necessary for evaporation, usually about 1500° C., resulting in a wrong final composition. It is noted that the ferroelectric compositions contain such low melting point materials as lead and bismuth, and such high melting point materials as tantalum and niobium.

It is well-known in the art that sputtering techniques offer a better chance at maintaining the composition from the source to the substrate. Since the thermal effect is not involved, as is the case with evaporation, theoretically high melting point materials and low melting point materials can be uniformly deposited from the same cathode or target onto the substrate. However, in attempting to utilize a target of the final composition as is desired upon the substrate, various problems arise. These include maintaining a high substrate temperature to assure adhesion, and the fact that the target materials are not being sputtered in the form of molecules but as individual materials. Thus, some of the oxides tend to be reduced to other oxides and metals having varying sticking coefficients and varying characteristics as to the composition finally deposited. The net result is that the final composition achieved is not the one desired. Also, if the substrate temperature is too high, the low melting point metals will be selectively evaporated from the substrate after deposition from the target, before they will be re-oxidized, which will allow adherence to the substrate.

Varying the target composition in the form of mixed oxides to compensate for the losses discussed above results in a critical balancing factor, and is both costly to fabricate and difficult to control. Considering that the size of such a target might be one-quarter inch in thickness by five inches in diameter, to be attached to a water-cooled electrical contact in a conventional sputtering system, the cost of such fabrication can be expensive. It may require that the ceramic powders be hot-pressed and sintered to achieve the final composition of the target itself.

Thus, it is an object of this invention to provide a sputtering target composition for use in a reactive atmosphere for the deposition of thin ferroelectric films.

Another object of this invention is to describe a process by which ferroelectric films of substantially improved quality and performance can be made as thin or thinner than one micron.

A further object of this invention is the method of making an improved sputtering target for deposition of ferroelectric films on a substrate.

A further object of this invention is to allow such sputtering target to be economically made in a reproducible manner.

Yet another object of this invention is a sputtering method of forming a ferroelectric film upon a substrate utilizing the sputtering target of this invention.

Still another object is to describe how a suitable substrate can be made for such films.

SUMMARY OF THE INVENTION

These and other objects are met by the method of this invention. Briefly stated, a sputtering target comprising substantially pure metal particles of the six metals desired in the final ferroelectric composition is made by a powder-pressing technique. Electrical contact is made to the target, which is then attached to the sputtering system. By sputtering in a reactive atmosphere of oxygen in argon, sufficient reaction in controlled form occurs during deposition upon a heated substrate so as to form a ferroelectric film upon the substrate. Subsequent heat treatment of the formed film in the crystallization range results in a crystallized ferroelectric film having the desired electrical properties.

This invention will best be understood in relation to the following general description.

GENERAL DESCRIPTION

(1) The target

Assume that the preferred composition of a desired ferroelectric film is:

$$Pb_{.92}Bi_{.07}La_{.01}[Fe_{.405}Nb_{.325}Zr_{.27}]O_3$$

as discussed in the cited co-pending application of Chapman et al.

Following are the steps in the preparation of the sputtering target.

The six metal powders commercially available in the sizes of −325 mesh (Bi, Pb, Nb, Zr), −60 mesh (La), and 3 micrometers (Fe) are blended in proportion to their abundancy in the desired ferroelectric compound and then pressed in a mold.

In the above example, the materials for the target then comprise, in parts by weight of substantially pure metal, 16.1 parts iron, 10.3 parts bismuth, 1356 parts lead, 17.6 parts zirconium, 21.4 parts niobium, and 1 part lanthanum; for example, a total mass of 283.1 grams. These materials in the form of metal powders of substantially pure metal are blended in a ball mill and pressed into a disk of 12.2 centimeters diameter and a thickness of approximately .24 centimeter, applying a pressure of 21,800 p.s.i. for 20 minutes. No binder was utilized, and 94% theoretical density was achieved. This disk was soldered to a backing plate for use in a sputtering system.

Alternatively, prior to pressing, the mold may be heated to 200° C. Afterward, some pressure is maintained with C-clamps, while the mold is kept at 100° C. overnight. Otherwise, the target was found to warp (sufficient to distort) backing plate after attachment. Finally, the resulting disk, typically 0.25 cm. thick and of 12.7 cm. diameter (5″), is once more heated to 150° C. for 16 hours. Such procedure results in a stress-free, flat disk with a density of more than 90 percent of the theoretically maximum density. For the ease of soldering, the disk is sputter coated with copper and attached to its water-cooled backing plate. Four hours of presputtering are applied to bring the cathode surface into a state of compositional equilibrium.

The all-metal target represents a "simulated ferroelectric" composition or a "completely reduced ferroelectric" composition. The proportions of metals in the target is the same as the proportions of metals in the reduced oxide film. Correspondingly, the sputtering is 100 percent reactive. A completed metallic target has a number of advantages over a ceramic ferroelectric target: It can be reliably attached by soldering to its backing plate; it is more efficiently cooled and less susceptible to cracking; it allows also DC sputtering and causes more efficient RF coupling into the discharge. In a development project requiring target modifications, it is more economical and offers shorter turn-around times.

The pressure, size, and time noted above are merely representative. Obviously, other pressures, times, and mold sizes may be utilized. What is important is merely to hold the homogeneous mixture together. A binder may be utilized if desired, but must be in turn burnt off prior to target use.

In general, after forming the sputtering target, it is desirable to stress relief anneal the target so as to prevent any later warpage.

Electrical contact can be achieved to the target by a number of ways, the preferable method being vacuum deposition of a conductive material, such as copper, upon one face of the sputtering target when in disk shape. Clearly, other electrical contact methods may be utilized.

The sputtering target may also be made by other means, such as slurry casting into a mold, or pressing followed by repressing techniques, hot or cold pressing, or other methods known in the art. The important parameter is that the particles be homogeneously mixed so as to present a homogeneous face for use in the sputtering system.

As to the actual sputtering method itself, various controls are necessary to assure that the final composition is that desired above. In operation, the sputtering target of the composition outlined above is positioned in a sputtering system opposite the substrate. The substrate is heated to a temperature of between 350–600° C., preferably 550° C., and a partial pressure of 20–80 microns of a gas mixture comprising 5–25% by volume oxygen in an inert gas, preferably argon, is introduced into the system. The preferred pressure is approximately 40 microns, and the preferred ratio of oxygen to argon is 10–90% by volume.

Considering the size target mentioned before, a target wattage of between 100–800 watts is impressed, until the desired amount of target material is deposited as the film upon the substrate. Again, the preferred target wattage is 400 watts, which corresponds to 3.2 watts/cm.$^2$ of target surface. This results in a deposition rate of 133 A./min. 10,000 A. (1 micron) are deposited in one example. The target wattage is then removed, and the film is heated into its crystalline ferroelectric film character in a separate heating cycle, at 900° C. for two hours. Additionally, a magnetic field may be used during the film deposition, the field oriented to be perpendicular to both the target and the substrate. Again, a preferred magnetic field is approximately 100 gauss.

In greater detail, when applying 400 w. of RF power to the target with a diameter of 12.7 cm. (5"), the automatic cathode bias builds up to −1300 volts against ground potential. The gas composition and pressure and the substrate temperature are the determining parameters for the deposition. A mixture of 10.7–89.3 oxygen-argon at a pressure of 40 millitorr and a substrate temperature of 550° C. is desired for achieving the desired composition. The pressure is measured directly with a Pirani gauge in the sputtering chamber. A gas flow of 8 standard $cm.^3$ per minute through a throttled vacuum system is measured with a Hastings mass flow meter. The temperature is defined by a thin wire thermocouple placed on the surface of the substrate. Under these conditions and with a target-substrate spacing of 3.8 cm. and an applied magnetic field of 100 gauss a deposition rate of 135 A./min is achieved.

As deposited, the films are amorphous or only partially chemically reacted, as indicated by X-ray diffraction and by the lack of ferroelectric behavior. Therefore, the films are heat treated after the deposition to complete their chemical reaction and/or crystallization. For this treatment they are placed in a platinum boat charged with the powdered ferroelectric compound. The time schedule of temperature is a 2-hour rise to 900° C., a 2-hour hold at this temperature, followed by a 12-hour cooling period. This high temperature and corrosive atmosphere places severe requirements on the substrate if a conductive substrate is desired, as discussed later.

Other targets for compositions other than the preferred composition may be made by the same method described above. The weight percents, gram amounts used, and formulas are given in the table below.

by a host matrix of lead whose ductile nature permits molding of the cathode. Generally then, the compositions disclosed cover a generalized range, in weight percents, of

| | Percent |
|---|---|
| Fe | 5–8 |
| Bi | 5 |
| Pb | 66–68 |
| Zr | 8–15 |
| Nb | 7–11 |
| La | .5 |

for Formulas A–D. The lead percentage is the same for A–D as for E and F.

It is further evident that the actual amounts of metal powders used to form the target mixture will be empirically determined in many cases. Thus, where vapor pressures differences exist between different target materials, it may be necessary to include an excess of one material over another to compensate for this difference. This compensation is well known in the art, and by analyzing two or three final sputtered film compositions against the target compositions, the final target composition can be determined. Of course, the target resulting from the different metal powders must be electrically conductive and essentially homogeneous in mixture.

Conductive substrate

The substrate desirably is mirror smooth and chemically inert. This is ideally provided by a noble metal film on a ceramic base if the noble metal film can be made to adhere to a ceramic through the processes of depositing the ferroelectric film and firing it in the corrosive atmos-

| | A | | B | | C | | D | |
|---|---|---|---|---|---|---|---|---|
| | Wt., g. | Wt., percent | Wt., g. | Wt., percent | Wt., g. | Wt., percent | Wt., g. | Wt., percent |
| Fe | 22.6 | 8.0 | 21.2 | 7.4 | 19.6 | 6.9 | 17.0 | 5.9 |
| Bi | 14.6 | 5.1 | 14.6 | 5.1 | 14.6 | 5.1 | 14.6 | 5.1 |
| Pb | 190.0 | 67.0 | 190.0 | 67.0 | 190.0 | 66.6 | 190.0 | 66.3 |
| Zr | 24.6 | 8.7 | 29.2 | 10.3 | 33.8 | 11.8 | 42.9 | 14.9 |
| Nb | 29.9 | 10.5 | 27.6 | 9.7 | 25.3 | 8.9 | 20.7 | 7.2 |
| La | 1.4 | 0.49 | 1.4 | 0.49 | 1.4 | 0.49 | 1.4 | 0.49 |
| Total weight | 283.1 | | 284.0 | | 284.7 | | 286.6 | |

Formula A is $Pb_{.92}Bi_{.07}La_{.01}(Fe_{.405}Nb_{.325}Zr_{.27})O_3$.
Formula B is $Pb_{.92}Bi_{.07}La_{.01}(Fe_{.38}Nb_{.30}Zr_{.32})O_3$.
Formula C is $Pb_{.92}Bi_{.07}La_{.01}(Fe_{.355}Nb_{.275}Zr_{.37})O_3$.
Formula D is $Pb_{.92}Bi_{.07}La_{.01}(Fe_{.305}Nb_{.225}Zr_{.47})O_3$.

Two other formulas and their target compositions are:

E: $Pb_{0.99}Nb_{0.02}[(Zr_{0.50}Sn_{0.50})_{0.86}Ti_{0.14}]_{0.98}O_3$

| | Atomic weight | Weight (1 mole), g. | Weight, percent |
|---|---|---|---|
| Pb | 207.2 | 204.5 | 67.1 |
| Nb | 92.0 | 1.8 | 0.6 |
| Zr | 91.2 | 38.4 | 12.6 |
| Sn | 118.7 | 51.0 | 16.7 |
| Ti | 47.9 | 6.6 | 2.2 |
| Total | | 302.3 | |

F: $[Pb_{.99}Sb_{.02}(Zr_{.66}Ti_{.34})_{.98}]_{.90}(LaFeO_3)_{.10}$

| | Atomic weight | Weight (1 mole), g. | Weight, percent |
|---|---|---|---|
| Pb | 207.2 | 184.0 | 67.4 |
| Sb | 121.8 | 2.2 | 0.8 |
| Zr | 91.2 | 53.0 | 19.4 |
| Ti | 47.9 | 14.4 | 5.3 |
| La | 138.9 | 13.9 | 5.1 |
| Fe | 55.8 | 5.6 | 2.1 |
| Total | | 273.1 | |

These sputtering targets A–F all have approximately 66–67% by weight of lead. Essentially then, the other materials of the target are imbedded in and held together phere at 900° C. The following process yields a high quality substrate capable of the above performance.

Polished sapphire chips, 0.025" thick, are sputter etched for 40 minutes with a RF power density of 1.5 $W./cm.^2$ in an atmosphere of argon or oxygen or a combination thereof at a pressure of approximately 40 microns. This process exposes a clean surface free of the disturbances caused by the polishing process and also free of embedded polishing materials. Subsequently, platinum is sputter deposited onto these substrates at a temperature of 550° C., first for 14 minutes in pure oxygen at a pressure of 20 microns, then for another 14 minutes in pure argon at a pressure of 10 microns. The sputtering power density on the cooled, pure platinum target is 5.6 $w./cm.^2$. A target to substrate distance of 3.2 cm. and a magnetic field of 100 gauss perpendicular both to target and substrate are maintained. Such a film is about 1 micron thick. It adheres well to the sapphire substrate. For still tougher films, demonstrated by scratch-testing, the platinum coated sapphire is heat treated for 2 hours at 900° C. in air. This, of course, is but one example of a substrate that may be used within the scope of this invention.

The ferroelectric films, typically 1 micron thick, possess all the desirable ferroelectric characteristics for applications in computer memories. As shown in hysteresis measurements in a range of frequencies from 20 Hz. to 20 kHz., the coercive field is as low as 17 kv./cm., the spontaneous polarization is about 37 $\mu c./cm.^2$, whereas the remanent polarization is 30 $\mu c./cm.^2$ indicating a loop squareness $S=30/37=80$ percent. This polarization is retained, and switching at 20 kHz. is possible for many million cycles, before the polarization is reduced by crystal fatigue. The relative dielectric constant (permittivity) of the film is about 600.

In essence then, since the use of a final composition target for depositing upon the substrate results in decomposition of the target, the method described above which comprises this invention essentially starts with the original metals and composes the final composition on the substrate surface. The use of the reactive atmosphere is of course necessary where an oxide system is the final composition desired. Thus, the advantages of this system in both the composition, method of making the target, and method of deposition is clear compared to the prior art. Other advantages also evident with this invention are:

(1) Compared with the sector cathode described in the prior art, more than two metals can be conveniently incorporated, and the anode does not have to be rotated because the metals are finely dispersed rather than ordered in sectors.

(2) A ceramic target is costly to produce. It is more difficult to attach a ceramic target to a metal backing plate than the method of this invention. To do that, the ceramic of the prior art must be metallized for soldering, if a less reliable epoxy bond is not used for convenience.

(3) If an alloying method is desired, this will work only with compatible metals. It is extremely difficult, if not impossible, to make combinations of metals with widely varying characteristics, such as melting point, and which are not mutually soluble.

(4) The fabrication of the prior art ceramic targets using the methods previously described is costly and time-consuming. Starting with metal oxides of lead, iron, bismuth, niobium, zirconium, and lanthanum, the following oxide mixture must be formed: lead ferroniobate, lead zirconate, bismuth ferrate, and lanthanum ferrate. Subsequently, the ferroelectric composition is formed. After regrinding the product, it must be formed into a solid sputtering target by hot pressing, with problems of cracking to be overcome. In contrast, the method of this invention comprises only the blending and pressing of metal powders and is a fast and economical method of producing the sputtering target. Further, the sputtering of the metal target in an oxidizing atmosphere results in larger deposition rates than that obtained from a ceramic target. A metal target may also be sputtered with DC. And, a well-compacted metal target is easier to keep cool than a ceramic target.

While certain embodiments have been described in this invention, it is clear that many alternatives exist and may be utilized by others skilled in the art while still maintaining the scope and character of this invention.

What is claimed is:

1. A sputtering method of forming a crystallized ferroelectric film upon a substrate, comprising the steps of positioning in a sputtering system said substrate opposite a target electrode consisting essentially of an electrically conductive essentially homogeneous mixture of metal powders selected from the group consisting of: (a) iron, bismuth, lead, zirconium, niobium and lanthanum, and (b) lead, niobium, zirconium, tin and titanium, and (c) lead, antimony, zirconium, titanium, lanthanum and iron.

heating said substrate to a temperature between 350°–600° C. in a partial pressure of 20 to 80 microns of a gas mixture comprising 5–25% by volume oxygen in an inert gas, applying a target wattage of between .8–6.3 watts per cm.$^2$ until the desired amount of target material is deposited as a film upon said substrate, discontinuing said target wattage, and heating said film structure to a temperature and for a time sufficient to crystallize said film, whereby a crystallized ferroelectric film of said mixture of metal powders is formed upon said substrate.

2. The sputtering method of claim 1 wherein said metal powders comprise metal powders in a host matrix of lead.

3. The sputtering method of claim 1 wherein said metal powders are present in the weight percents of substantially 67.1% lead, .6% niobium, 12.6% zirconium, 16.7% tin, 2.2% titanium.

4. The sputtering method of claim 1 wherein said metal powders are present in the weight percents of substantially 67.4% lead, .8% antimony, 19.4% zirconium, 5.3% titanium, 5.1% lanthanum, and 2.1% iron.

5. The sputtering method of claim 1 wherein said metal powders are present in the weight percents of substantially 5–8% iron, 5% bismuth, 66% lead, 8–15% zirconium, 7–11% niobium, 0.5% lanthanum.

6. The method of claim 1 wherein said substrate temperatures are substantially 550° C.

7. The method of claim 1 wherein said gas mixtures comprises oxygen and argon.

8. The method of claim 1 wherein said gas mixture is, by volume, 10% oxygen and 90% argon.

9. The method of claim 1 wherein said target wattage is substantially 3.2 watts per square centimeter.

10. The method of claim 1 wherein the total gas pressure is substantially 40 microns.

11. The method of claim 1 including the step of applying a magnetic field during film deposition, said magnetic field oriented to be perpendicular to both said target and said substrate.

12. The method of claim 1 wherein the substrate is a noble metal film coated on a ceramic substrate by sputtering.

13. The method of claim 12 wherein the noble metal is platinum and the ceramic is sapphire.

References Cited

FOREIGN PATENTS 1,184,428 3/1970 Great Britain ........ 204—192

OTHER REFERENCES

Yudin: "Chemical Abstracts," vol. 63, p. 10835g (1965).

Tanaka et al.: "Chemical Abstracts," vol. 64, p. 11997c (1966).

Gerson et al.: "Chemical Abstracts," vol. 66, p. 59935z (1967).

JOHN H. MACK, Primary Examiner

S. S. KANTER, Assistant Examiner

U.S. Cl. X.R.

252—62.56